March 10, 1953  B. COHEN  2,631,245
METHOD OF FORMING COATING CONTAINING URANIUM
AND METHOD OF ISOTOPIC ANALYSIS
Filed March 22, 1946
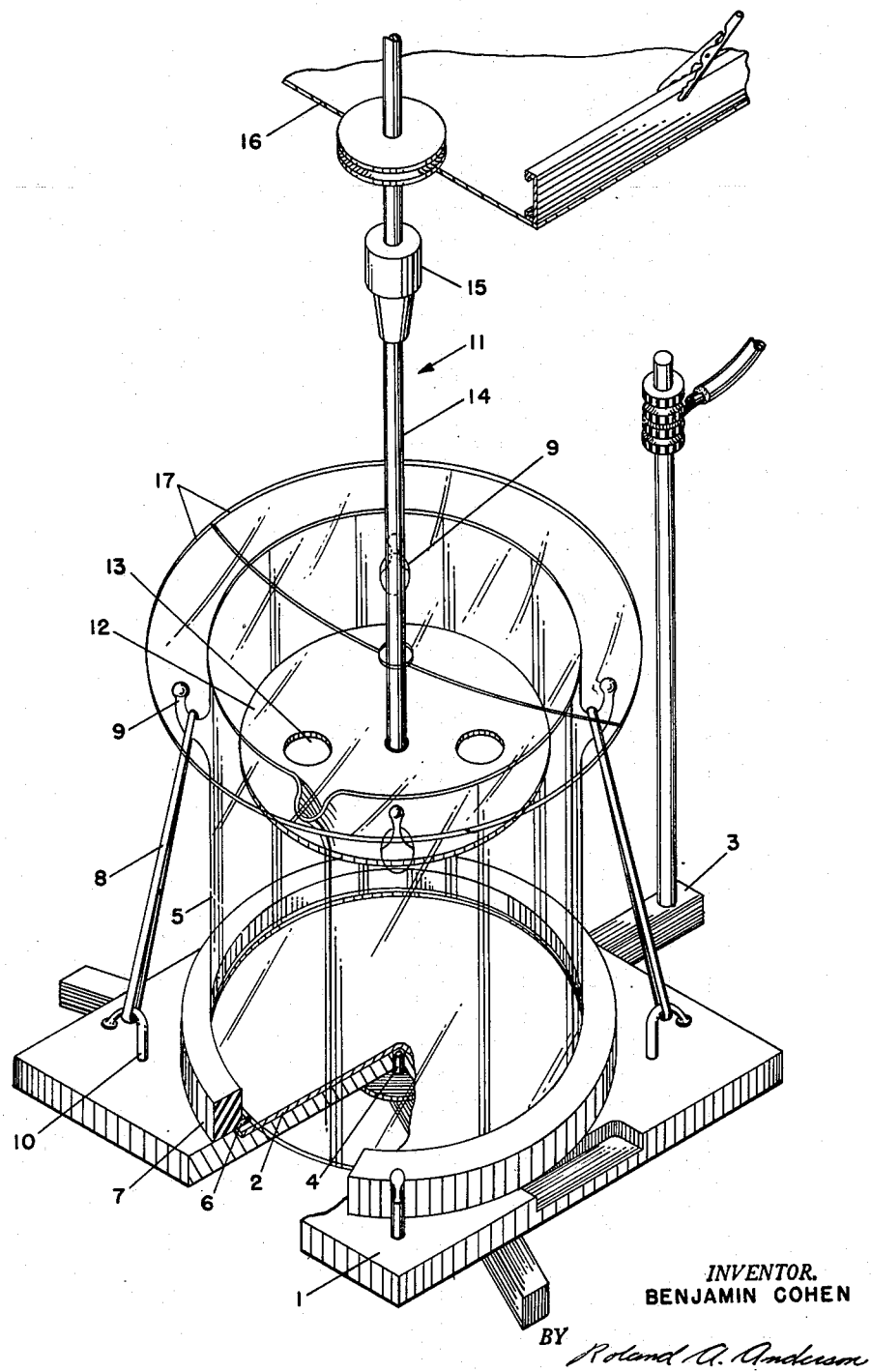
INVENTOR.
BENJAMIN COHEN
BY Roland A. Anderson Patented Mar. 10, 1953

2,631,245

UNITED STATES PATENT OFFICE 2,631,245

METHOD OF FORMING COATING CONTAINING URANIUM AND METHOD OF ISOTOPIC ANALYSIS

Benjamin Cohen, New York, N. Y., assignor to the United States of America as represented by the United States Atomic Energy Commission Application March 22, 1946, Serial No. 656,469

2 Claims. (Cl. 250—83)

This invention relates to a method of forming coatings containing uranium, useful for the isotopic analysis of uranium; and to a method of isotopic analysis for radioactive elements and particularly for uranium.

Uranium 235 (the numeral indicating atomic weight) has proved to be useful as a source of atomic energy. Processes have been developed for enriching natural uranium, which contains uranium 234, 235 and 238 in a definite ratio, with respect to uranium 235. One particularly useful process involves separating the isotopic species of uranium hexafluoride, $U^{235}F_6$ from $U^{238}F_6$, by diffusion of the gaseous compound through porous, permeable metal membranes.

It will be readily apparent that in any enrichment process it is necessary for the purposes of control to determine the isotopic composition of the uranium in the material being processed, at various stages. As indicated, the uranium may be in the form of a compound.

In general, the isotopic composition of a radioactive element may be determined by determining the weight of the element in a sample of unknown isotopic composition and in a standard, e. g., a sample of known isotopic composition, measuring by means of suitable counting apparatus under the same conditions the intensity of radiation emitted by each sample, and correlating the data thus obtained. For example, in the case of uranium, the percentage of uranium 235 in a mixture of uranium isotopes may be determined by bombarding each sample of known uranium content with neutrons and counting the fission fragments emitted. Alternatively the alpha particle emission, of which the concentration of uranium 234 is a function, may be counted when, in a given enrichment process, enrichment with respect to uranium 235 proceeds in a definite, known relationship to enrichment with respect to uranium 234.

Isotopic analysis is thus based on a comparison of the counts obtained respectively from an unknown sample and a standard sample, each containing a known weight of the element to be analyzed. It is evident that the accuracy of the result depends on the accuracy of two determinations: the weight of the element in each sample and the count.

The accuracy of the count depends to some extent on the physical characteristics of the sample. Suitably the sample should be in the form of a layer adherent to one flat surface of a supporting base. The layer should adhere firmly to the base, otherwise parts of the layer will tend to flake off and be removed during handling or counting, thus introducing an error. The probable error in counting decreases as the number of radiations counted increases. The thickness tolerance of an adherent layer should therefore be sufficient for a large number of radiations to be counted in a reasonably short time. Any thickness variation in the layer should be reproducible in order accurately to correct for the absorption of radiations coming from the lower part of the layer.

One object of the present invention is to provide a method of forming a coating containing uranium which has the above described desirable physical characteristics for counting and is therefore useful generally as a step in methods of isotopic analysis. Such coatings, because of their qualities of hardness, good adherence relative to thickness and strikingly beautiful metallic luster are useful not only in isotopic analysis but in other arts as well, for example in the decorative arts.

Another object of the present invention is to provide a method of isotopic analysis for radioactive elements which permits the attainment of high accuracy, e. g., an accuracy of 0.1%, and which nevertheless is adapted to use on a plant scale. Thus, it is desired to provide a method of isotopic analysis useful when extremely small quantities of the element are available for analysis, e. g., quantities of uranium in the microgram range; to analyze and check the analysis of the element with but one weighing; in some cases to use a macro analytical balance for weighing without sacrifice of accuracy; to employ inexpensive equipment rather than such articles as micro balances and platinum supports for the coatings. The present invention contemplates a method of isotopic analysis which is flexible with respect to the quantity of element which may be analyzed thereby and the type of personnel and equipment that may be used, and which is therefore rapid, economical and of broad application.

According to the present invention, coatings containing uranium may be formed which have the above described desirable physical characteristics for counting, by a method of electrodeposition under definite conditions presently to be defined. However, it has now been found that a layer containing a radioactive element so deposited will contain a high percentage of impurities consisting of electrolyzed products of the materials of the electroplating cell itself. Therefore if, in carrying out an isotopic analysis, one determines the weight of the element in the layer by weighing the base before and after electrodepositing the layer thereon and assuming that the layer consists of a particular, pure compound, an error will be introduced which will prevent attainment of the high accuracy here sought.

A method of isotopic analysis is therefore proposed in which an electroplating solution is formed containing a predetermined weight of the element to be isotopically analyzed, substantially all of the element contained in the solution is electrodeposited on an electrode of suitable shape serving as a base and the intensity of radiation emitted by the layer so deposited is measured. It is understood that a standard sample is similarly prepared and measured. The calculation of isotopic composition is based upon the weight of the element in the solution, which may be determined, for example, by dissolving a desired weight of a suitable pure compound of the element; and on the measurement of radiation intensity. The advantages of electrodeposition, in respect of obtaining a coating of desirable physical characteristics for counting are retained, and the disadvantage of electrodeposition, in respect of accurately determining the weight of the element in the layer after it has been deposited, is completely circumvented by forming an electroplating solution containing a predetermined weight of the element and electrodepositing substantially all of the element in the solution on a suitable base.

The method of electrodepositing uranium here proposed is therefore one which is adapted to this quantitative technique in addition to producing layers having desirable characteristics for counting. It has been found that a number of factors require careful control. An electrolyte, preferably an ammonium salt of a weak acid such as ammonium oxalate, ammonium acetate or ammonium carbonate, should be present in an amount between 0.04 to 40 millimoles. The cathodic current density should be in the range of 0.04 to 0.16 ampere per square centimeter. The temperature should be in the range of 45° C. to 95° C. Vigorous agitation of the solution should be maintained throughout the electroplating operation. For quantitative deposition there should be at least one square centimeter of available cathode surface per milligram of uranium in the solution, to obtain good adherence of the deposit.

The invention will be described in detail in relation to the isotopic analysis of uranium submitted for analysis as uranium hexafluoride; and with reference to the drawing which is a perspective view partially broken away of a suitable collapsible type electroplating cell.

Referring to the drawing, a supporting plate 1 of a metal such as brass is provided centrally with a circular stepped recess. A thin disc 2, consisting of a metal such as platinum, Monel metal, nickel or copper fits within the lowermost portion of the recess with its upper surface approximately flush with the upper level of the recess. The plate 1 is in contact with an electrical contacting member 3 which engages the plate 1 at a central opening thereof by means of a vertical peg 4. The disc 2, resting on the plate 1 which is in contact with the electrical contacting member 3 may thus be connected as a cathode and serve as a base for deposition of the uranium from the solution. The available surface area for deposition, of the disc 2, is suitably about 25 square centimeters. A cylindrical glass member 5, open at both ends, is seated on a lower retaining flange 6 of a rubber gasket 7 and this assembly is mounted on the plate 1. It is positioned so that the gasket 7 fits within the recess, resting on the upper level thereof and on the rim of the disc 2. The member 5 is forced toward the disc 2, the flange 6 of the gasket forming a leakproof seal therebetween; this is effected by elastic bands 8 stretched between cooperating prongs 9 and 10 of the member 5 and plate 1 respectively. A stirrer 11 consists of a thin platinum disc 12 provided with openings 13 and soldered to a metal rod 14 which is attached to a suitable rotating mechanism 15. The latter is supported on and makes contact with an electrical contacting member 16 whereby the disc 12 may be connected as the anode of the cell. The contacting members 3 and 16 are connected to a source of current of 3 amperes. When the cell is in use it may be covered with two halves 17 of a glass dish having a central opening for the rod 14, to prevent overflow of the solution. The total volume of the cell is suitably about 100 ccs.

The uranium hexafluoride to be analyzed is distilled and the distillate introduced into water in which it dissolves. The solution is evaporated and heated at about 700° C. to form pure uranouranic oxide, $U_3O_8$. About 10 milligrams of the oxide is carefully weighed. The weighed amount of oxide is dissolved in a few drops of concentrated nitric acid and the solution is placed in the electroplating cell. About 10 ccs. of 0.4 M amonium oxalate is added to the contents of the cell and enough distilled water is added to bring the volume to about 30 cc. The electroplating cell is placed in a water bath which is maintained at a temperature of about 80° C. throughout the electroplating operation. The disc-shaped anode 12 is placed under the surface of the solution and is rotated by the rotating mechanism 15 at a speed of about 500 R. P. M. Current is turned on, furnishing a cathodic current density of about 0.12 ampere per square centimeter. Deposition is complete in about 15 minutes but preferably the current is applied for about 50 minutes to provide a high safety factor.

The disc 2 is removed from the exhausted electroplating solution and dried by a heat treatment. The temperature selected for the drying operation depends on the metal of which the disc 2 is made. If the disc 2 consists of one of the noble metals such as platinum, the temperature may be in the range of 250° C. to 450° C. at which $UO_3$ forms or in the range of 650° C. to 850° C. at which $U_3O_8$ forms. If the disc consists of a readily oxidizable metal, the temperature must be in the lower range. It is preferred to use the latter group of metals because of their cheapness. The fact that they tend to oxidize and undergo change in weight even when heated at temperatures in the lower range is no objection to their use since the disc is not weighed in the present method of isotopic analysis.

A standard sample is prepared in like manner. The alpha particle emission or the fission fragment emission of the unknown sample and of the standard sample are then measured. Knowing the weight of uranium added to the electroplating solution and the count obtained, for the respective samples, the isotopic composition of the uranium in the unknown may be calculated.

It should be apparent that the method of the present invention is equally applicable when the uranium submitted for analysis is in a form other than uranium hexafluoride, e. g., uranium dioxide (UO$_2$), urano-uranic oxide (U$_3$O$_8$), uranium tetrafluoride (UF$_4$) or uranyl fluoride (UO$_2$F$_2$).

A number of advantages accrue from the fact that the weight of the element in the electrodeposited layer is determined at a stage prior to the formation of this layer, when a material containing the element is in gross, so to speak. For example, it is good practice to check an analytical result one or more times. Thus, a material to be analyzed may be converted to pure form, and a quantity of the pure substance sufficient for several determinations may be weighed and dissolved in a suitable solvent. Several aliquots may then be taken from this source for use in several electroplating solutions without the need for further weighings. If a large enough amount of the pure substance is available it may be weighed by means of the usual macro analytical balance instead of a micro balance without sacrificing accuracy, and aliquots taken. In the event that there is only enough of the substance to form a single coating, a check may be made by dissolving the coating after its radioactive emission has been measured and again going through the steps of purifying, weighing, dissolving in an electroplating medium, electrodepositing and counting. In this case there is very little loss of the substance since substantially all of the element in the second electroplating solution is deposited.

Also, the weight of the element added to the electroplating medium may be determined by a measurement other than a weight measurement. For example, when a material is submitted for analysis which contains a volatile compound of the element, such as uranium hexafluoride, it is convenient to fill a container of predetermined volume with the material in vapor form and to determine the temperature and the pressure of said volatile compound in the container whereby the weight of said compound may be determined. Alternatively the material submitted for analysis may be dissolved and an aliquot of the solution titrated with a suitable reagent to determine the weight of the element therein.

It appears that the accuracy of the present method is limited only by the precision with which the fundamental weighing (or volumetric measurement or titration) may be made. It has been found that an accuracy of 0.1% is obtainable which compares favorably with that of the mass spectrometer. The present method, however, has the further advantage that analyses may be carried out when only small amounts of material, e. g., having a uranium content in the microgram range, are available for analysis.

Since many embodiments might be made of the present invention and since many changes might be made in the embodiment described, it is to be understood that the foregoing description is to be interpreted as illustrative only and not in a limiting sense.

I claim:
1. The method of determining the isotopic composition of uranium which comprises forming an aqueous electroplating solution containing a weighed amount of the uranium to be analyzed and 0.04 to 40 millimoles of an ammonium salt of a weak acid, electrodepositing the uranium in said solution on one flat surface of a cathode by passing through said solution a current in the range of 0.04 to 0.16 ampere per square centimeter of cathode surface meanwhile maintaining said solution under agitation and at a temperature between 45° C. and 95° C. until substantially all of the uranium in said solution has been deposited on said cathode, said cathode providing at least 1 square centimeter of surface for deposition per milligram of uranium in said solution, and measuring the intensity of radiation emitted by the layer so deposited to permit calculation of the isotopic composition from the measurement of radiation intensity and the weight of the uranium in said solution by comparison with a standard.

2. The method of determining the isotopic composition of uranium which comprises carefully weighing about 10 mgs. of U$_3$O$_8$, forming an aqueous electroplating solution containing the weighed amount of U$_3$O$_8$ and 4 millimoles of ammonium oxalate, electrodepositing the uranium in said solution on about 25 square centimeters of a flat cathode surface by passing through said solution a current of about 3.0 amperes meanwhile maintaining said solution under agitation and at a temperature of about 80° C. for 15 to 50 minutes whereby substantially all of the uranium in said solution is deposited in an adherent layer on said cathode, and measuring the intensity of radiation emitted by the layer so deposited to permit calculation of the isotopic composition from the measurement of radiation intensity and the weight of the uranium in said solution by comparison with a standard.

BENJAMIN COHEN.

REFERENCES CITED

The following references are of record in the file of this patent:

The Fission of Uranium, Phy. Rev., vol. 55, pp. 511 and 512, March 1939.

Electrochemistry of Uranium, J. Phys. Chem., vol. 23, pp. 517–553, 1919.

MMDC–973 United States Atomic Energy Commission, pages 1–3, March 26, 1943.

MMDC–1368 United States Atomic Energy Commission, pp. 1–4, August 27, 1945.

Comptes Rendus, 200, 1935, pp. 1024–1027.

Comptes Rendus, 201, 1935, pp. 473 and 474.

Zeitschrift für Anorganische Chemie, 81, 1913, pp. 200–205.